2,816,819
PROCESS OF REMOVING FERROUS SULFATE FROM SULFATE SOLUTIONS CONTAINING NICKEL AND/OR COBALT

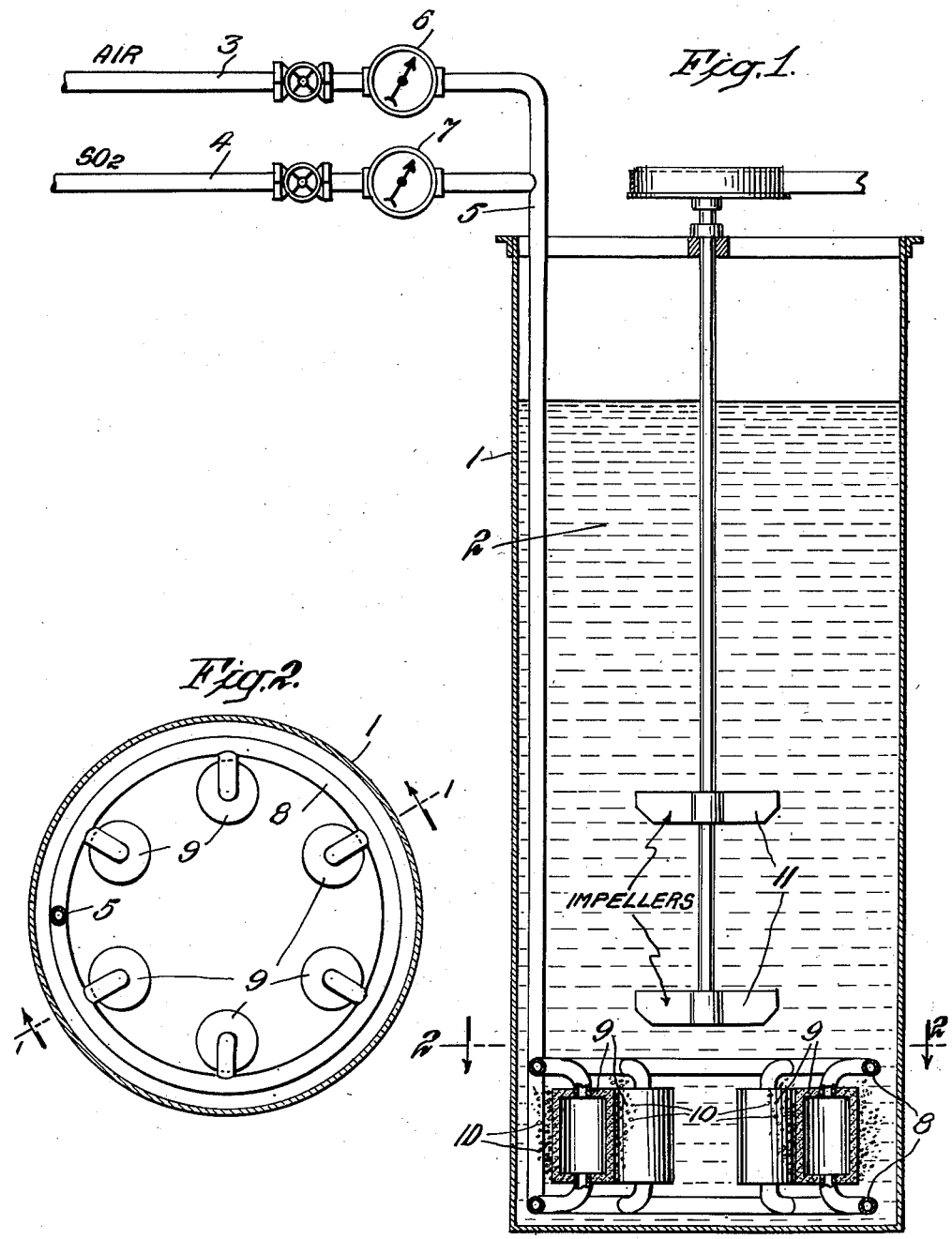

Albert Edward Wallis, Pembury, near Tunbridge Wells, and DeWitt Henry West, Port Eynon, Swansea, England, assignors to The International Nickel Company, Inc., New York, N. Y., a corporation of Delaware Application October 22, 1954, Serial No. 464,182

Claims priority, application Great Britain September 7, 1949

4 Claims. (Cl. 23—117)

The present invention relates to a new and improved process for purifying solutions of nickel and/or cobalt and, more particularly, to an improved process for purifying solutions of nickel and/or cobalt by removing metallic impurities without substantial loss of nickel and/or cobalt.

Heretofore, the art has endeavored to remove substantially all the iron from nickel- and/or cobalt-containing solutions by various proposed methods. A method commonly employed for the production of nickel and/or cobalt sulfate comprises treating nickel- and/or cobalt-containing materials, such as, for instance, calcined and reduced nickel matte, with sulfuric acid in order to dissolve the matte and to provide a neutral or faintly acid solution containing nickel and/or cobalt sulfate. The resulting solution is treated to remove impurities, and the nickel and/or cobalt sulfate is then recovered by evaporation after the removal of impurities therefrom. In the dissolution of the nickel- or cobalt-containing materials, the solution may be contaminated with impurities and especially ferrous sulfate. It has been common practice to convert the ferrous sulfate within the solution to ferric sulfate by aeration in the presence of a base or a basic agent, which is usually nickel carbonate or nickelous hydrate. During the aeration procedure, the ferrous iron is oxidized to ferric iron. The ferric iron reacts in the presence of the base and is precipitated as ferric hydroxide. This precipitate of ferric hydroxide is then separated from the solution. However, in the aeration practice, much nickel is precipitated along with iron.

Another method for converting ferrous iron within the nickel and/or cobalt sulfate solution to ferric iron has been to oxidize the ferrous iron to ferric iron by the addition of hydrogen peroxide to the solution in the presence of a base, such as nickel carbonate, etc. The ferric iron provided by the oxidation with hydrogen peroxide reacts in the presence of the base to form a precipitate of ferric hydroxide which can then be removed from solution. When hydrogen peroxide is employed as the oxidizing agent, there is a tendency for it to decompose, especially if cobalt is present in the solution, since the cobalt appears to act as a catalyst in accelerating the decomposition of hydrogen peroxide. Hydrogen peroxide also provides some precipitation of iron before all of the ferrous iron is converted to ferric iron.

In the methods employed heretofore for removing iron from the nickel and/or cobalt solutions, the ferric iron precipitate invariably contains substantial amounts of insoluble nickel. We have found that this is due to the formation of an insoluble nickel-iron complex when ferrous iron and ferric iron co-exist in the presence of a base. This complex has a nickel to iron ratio of about 1:1. In order to recover this nickel and/or cobalt in the precipitate, it has been necessary, by prior art methods, to re-treat this precipitate many times in order to secure a substantially complete separation between the nickel and/or cobalt and the iron. Although many attempts were made to overcome the foregoing difficulties and disadvantages inherent in the prior art processes, none, as far as we are aware, was entirely successful when carried into practice commercially on an industrial scale.

We have discovered that when all the iron in the nickel- and/or cobalt-containing solution is first oxidized to the ferric state prior to adding a basic agent to the solution to precipitate said ferric iron, the insoluble complex nickel-iron compound is not formed, and a ferric precipitate substantially free from nickel or cobalt will be produced. In such a precipitate, the ratio of nickel to iron in the precipitate may be as low as 1:40. Furthermore, if substantially all of the ferrous iron is converted to ferric iron prior to adding the basic agent to precipitate the iron, it is then unnecessary to aerate the solution either during or after the addition of the basic agent. In fact, mere aeration alone will not convert substantially all the ferrous iron in a nickel- and/or cobalt-containing solution to the ferric state. However, substantially all of the ferrous iron can be converted rapidly to ferric iron if the air blown through the solution contains a small amount of sulfur dioxide gas. Another advantage in using sulfur dioxide as an oxidizing agent is that it does not introduce undesirable impurities into the solution.

It is an object of the present invention to provide a process for converting substantially all of the ferrous iron in a nickel and/or cobalt sulfate solution to ferric iron.

Another object of the invention is to provide a process for removing substantially all of the iron from a sulfate solution containing nickel and/or cobalt by precipitation of iron therefrom without, at the same time, also precipitating substantial amounts of nickel and/or cobalt from said solution.

It is a further object of the invention to provide a process wherein nickel and/or cobalt salts can be purified of iron in an economical and effective manner so that substantially pure nickel and/or cobalt sulfate salts can be recovered for commercial uses.

Other objects and advantages of the invention will become apparent from the following description taken in conjunction with the drawing.

Generally speaking, the present invention provides a process for purifying aqueous solutions containing nickel and/or cobalt sulfate and also containing iron in ferrous form. The purification involves treatment with a particular oxidizing medium, employed in a particular manner, which will convert substantially all of the ferrous iron to ferric iron without concomitantly forming an insoluble nickel-iron complex compound. The ferric iron is then removed from the nickel- and/or cobalt-containing solution by the addition of a suitable base to precipitate said iron. The nickel and/or cobalt solution which contains ferrous iron and which is to be treated according to the present invention is aerated with finely-divided bubbles of air containing a small amount of sulfur dioxide gas. To obtain the results of the present invention, it has been discovered that not air alone but air containing small but critical amounts of sulfur dioxide must be passed through the solution in order to obtain substantially all the iron therein in the oxidized (ferric) state. It has also been discovered that the special gas mixture employed in accordance with the invention must be passed into the iron-containing solution while said gas mixture is in a finely-divided or finely-dispersed state. It is preferred that the gas mixture be reduced to fine bubbles by passing it into the solution through a porous membrane having a pore size, e. g., pore diameter, up to about 100 microns. Usually, the pore size will be at least about 50 microns. The finely-divided or dispersed mixture of air and sulfur dioxide gas is bubbled through the nickel and/or cobalt solution containing ferrous iron in sufficient quantities and for a sufficient length of time to convert substantially all of the ferrous iron in the solution to ferric iron. After all the ferrous iron is converted to the ferric state, a suitable base, such as nickel carbonate, is added to the solution under treatment to precipitate substantially all of the ferric iron from the solution. The precipitate of iron is then removed from the resulting nickel- and/or cobalt-containing solution. This process produces a nickel and/or cobalt sulfate solution substantially devoid of iron and a removable iron precipitate which is substantially devoid of nickel and/or cobalt.

In practicing the present invention, it is essential that the basic agent, such as nickel carbonate, not be added to the nickel- and/or cobalt-containing solution until the solution has been treated with enough finely-dispersed air and sulfur dioxide to convert substantially all the ferrous iron to ferric iron. As stated heretofore, when the base is added to the solution before all the ferrous iron is converted to ferric iron, the resulting iron precipitate produced by the addition of the base will carry down some nickel and/or cobalt with the iron precipitate and said nickel and/or cobalt will be lost with the removal of the iron precipitate. Furthermore, when all of the ferrous iron is not converted to ferric iron before the base is added, the rate of oxidation of the remaining ferrous iron to ferric iron will be impeded.

The initial nickel- and/or cobalt-containing solution treated according to the process described hereinbefore should be preferably adjusted to a pH between about 3 and about 5 before the solution is aerated with the finely-divided mixture of air and sulfur dioxide. It has been found that the treatment with air and sulfur dioxide gas lowers the pH of the solution during the conversion of ferrous iron to ferric iron. When the initial pH is below the preferred initial solution pH of 3, it is necessary to add an uneconomically large amount of base subsequent to the air and sulfur dioxide treatment in order to precipitate the ferric iron from the solution. When the initial pH is above the preferred maximum pH of 5, the conversion of ferrous iron to ferric iron with concomitant loss of nickel and/or cobalt from the solution will occur, a condition which the present invention avoids.

In treating the nickel- and/or cobalt-containing solution with the finely-divided mixture of air and sulfur dioxide gas to convert the ferrous iron therein to ferric iron, the sulfur dioxide mixed with the air is controlled to be at least 0.25% by volume but normally will not exceed about 3% by volume and under no known conditions should exceed about 5% by volume. More preferably, the sulfur dioxide concentration in the air-sulfur dioxide gas mixture is adjusted to be between about 2% and about 3% by volume. The rate at which the sulfur dioxide gas is absorbed depends upon the concentration of the ferrous iron and, as the ferrous iron content of the solution is reduced, it may be desirable also to reduce the sulfur dioxide content in the finely-divided oxidizing gas mixture. When, in practicing the invention, the sulfur dioxide concentration is allowed to exceed about 3%, there is no added efficiency or benefit in carrying out the process, but there will be only a waste of sulfur dioxide. However, the process is still operable when the sulfur dioxide gas concentration is permitted to exceed 3%.

The temperature of the initial nickel- and/or cobalt-containing solution is preferably maintained between about 80° C. and 90° C. When the solution treated with a mixture of air and sulfur dioxide is at a temperature substantially below about 80° C., the rate of ferrous iron oxidation is retarded, and a secondary reaction is produced in which sulfur dioxide is oxidized to sulfuric acid. This secondary reaction impedes the conversion of ferrous iron to ferric iron. When the temperature of the initial solution is above about 90° C., no benefit or improvement occurs but there will only be an unnecessary heat energy loss in the practice of the process above the temperature of about 90° C.

In treating the initial solution containing nickel and/or cobalt with the mixture of air and sulfur dioxide, the finely-divided or dispersed gaseous mixture is bubbled through the solution until substantially all the ferrous iron is converted to ferric iron prior to adding the base. It is important that the mixed gases be bubbled through the solution in finely-dispersed form. The gases may be finely dispersed by passing them through an enclosed sintered or fritted glass disc injector, a porous Alundum thimble, or other porous diffuser or membrane having a maximum pore diameter of about 100 microns. It is preferable to agitate the solution being treated with a mechanical mixer in order to insure sufficient agitation and surface contact between the solution being treated and the finely-dispersed mixture of air and sulfur dioxide gas. When the mixture of gas is finely dispersed throughout the solution in the manner described hereinbefore, the oxidizing reaction will be substantially completed in a relatively short time.

It is preferable to employ nickel or cobalt basic agents, such as nickel and/or cobalt hydroxide, nickel and/or cobalt carbonate, etc., in precipitating ferric iron from the nickel and/or cobalt solutions, after all the ferrous iron has been converted to ferric iron by the air and sulfur dioxide treatment. Other bases, such as lime or sodium carbonate, can be employed, but the bases named hereinbefore are preferred because they introduce nickel and/or cobalt into the solution rather than other elements.

After the treatment of the solution with the finely-dispersed mixture of air and sulfur dioxide gas has been completed, and substantially all the ferrous iron has been converted to ferric iron within the solution, the pH of the resulting solution is raised by the addition of a suitable base to precipitate substantially all the ferric iron. Of course, the pH is not raised to the point where the nickel and/or cobalt also precipitate. Satisfactory results are obtained when the pH is raised to a value between about 3 and about 4. The addition of the base to adjust the pH to between about 3 and about 4 after substantially all the ferrous iron has been converted to ferric iron precipitates substantially all nickel-free ferric iron out of the solution.

In order to give those skilled in the art a better understanding of the process of the invention, particularly with regard to the step of oxidizing to the ferric state ferrous iron contained in a nickel solution, reference is made to the attached drawing. In the drawing, the reference numeral 1 indicates a cell which holds the iron-contaminated nickel solution 2. Pipes 3 and 4 conduct air and $SO_2$, respectively, into the pipe 5. The flow gauges 6 and 7 are provided to permit proportioning of the air and $SO_2$ so as to provide the required concentration of these respective ingredients in the gas mixture admitted to the solution. The pipe 5 communicates to the headers 8, which in turn communicate with the porous diaphragms 9 through which the air-$SO_2$ mixture is passed into the solution in the form of finely-dispersed bubbles 10. The headers 8 may take any desired geometric form adapted to the form of the cell 1 so as to provide an appropriate amount of diaphragm area. Impellers 11 provide agitation which aids in carrying out the reaction between the bubbles of gas and the ferrous iron in the solution so as to convert the said ferrous iron to the ferric state. After oxidation of the ferrous iron is complete or substantially complete, the solution is then treated with an appropriate base, e. g., nickel hydroxide, so as to convert the ferric iron to ferric hydroxide which is then removed in a well-known manner as, for example, by filtration.

The process described hereinbefore is applicable to nickel- and/or cobalt-containing solutions containing iron in varying amounts. For example, it has been found that nickel and/or cobalt solutions containing iron in amounts up to about 8 grams per liter of iron have been treated successfully. In commercial practice, nickel and/or cobalt sulfate solutions containing iron in amounts between about 1 and about 8 grams per liter are satisfactorily purified of iron by the present process.

For the purpose of giving those skilled in the art a better understanding of the invention, the following illustrative examples are given:

EXAMPLE I

About two liters of solution containing about 130 grams per liter of nickel and cobalt as sulfates and about 3.9 grams per liter of ferrous iron as sulfate were introduced into a container and the solution heated to about 80° C. A gaseous mixture of air and sulfur dioxide, containing by volume about 1.33% sulfur dioxide, was passed through an enclosed sintered glass disc diffuser and bubbled through the sulfate solution at a rate of about 165 liters per hour. The solution was tested for ferrous iron at intervals and the following table illustrates the results of these tests:

| Period of Treatment with Air and SO₂ in Hours | Ferrous Iron Remaining in the Solution Treated, grams per liter |
|---|---|
| 0 | 3.9 |
| 1 | 2.2 |
| 1½ | 1.24 |
| 2 | 0.39 |
| 2¼ | 0.06 |
| 2½ | Nil |

The sulfur dioxide gas in the air was decreased by one-half after two hours to about 0.67% and after all the ferrous iron was converted to ferric iron, nickel carbonate base was added to the solution. The base was added slowly as a slurry while the solution was maintained at a temperature of about 90° C. After the solution had set for about five hours, the pH of the solution, which was about 2.5 after the treatment with air and sulfur dioxide, had risen to about 3.5 and no iron could be detected in the solution. A precipitate had formed and this was removed by filtration, was washed, and dried. The precipitate was analyzed and found to contain about 48.7% iron and only 2.1% of nickel and cobalt.

EXAMPLE II

Three different sulfate solutions containing determined amounts of cobalt and/or nickel and also containing about 4 grams per liter of ferrous iron, were separately introduced into containers and each heated to about 80° C. A mixture of air and sulfur dioxide was bubbled through each separate solution at a rate of about 6.4 liters per hour. This gaseous mixture containing about 3% sulfur dioxide by volume was introduced as finely-dispersed bubbles into the solution through a sintered glass disc injector having a pore diameter of about 65 microns and the solution was mechanically agitated.

A fourth solution containing cobalt sulfate free of nickel was aerated with air, free from sulfur dioxide gas, under the same conditions as the other three solutions. The results of these tests are illustrated in the following tables:

*Solutions treated with air+3% SO₂*

| Soln. No. | Orig. Liquor Conc. in gm./l. | ½ Hour | | 1 Hour | | 1½ Hrs. | | 2 Hours | |
|---|---|---|---|---|---|---|---|---|---|
| | | Fe++ Conc. | pH | Fe++ Conc. | pH | Fe++ Conc. | pH | Fe++ Conc. | pH |
| 1 | Ni=120, Co=Nil, Fe++=4 | 2.73 | 1.75 | 1.63 | 1.57 | 0.38 | 1.48 | Nil | 1.38 |
| 2 | Ni=105, Co=15, Fe++=4 | 2.75 | 1.74 | 1.85 | 1.61 | 0.73 | 1.44 | Nil | 1.38 |
| 3 | Ni=Nil, Co=120, Fe++=4 | 2.85 | 1.80 | 2.20 | 1.54 | 1.40 | 1.44 | 0.70 | 1.38 |

*Solution treated with air only*

| Soln. No. | Orig. Liquor Conc. in gm./l. | ½ Hour | | 1 Hour | | 1½ Hrs. | | 2 Hours | |
|---|---|---|---|---|---|---|---|---|---|
| | | Fe++ Conc. | pH | Fe++ Conc. | pH | Fe++ Conc. | pH | Fe++ Conc. | pH |
| 4 | Ni=Nil, Co=120, Fe++=4 | 3.45 | 2.55 | 3.50 | 2.51 | 3.35 | 2.46 | 3.25 | 2.38 |

Test solutions Nos. 3 and 4 are the same in composition and were treated in the same manner, except No. 4 was treated with air alone. The table confirms the results that air alone will not convert all the ferrous iron quickly and substantially to ferric iron. By comparing solutions Nos. 1 to 3 with solution No. 4, it is observed that sulfur dioxide is essential in oxidizing substantially all the ferrous iron to ferric iron.

EXAMPLE III

In order to illustrate the effect of decreased amount of sulfur dioxide, i. e., an amount less than about 3% sulfur dioxide, a solution containing about 100 grams/liter of nickel, about 20 grams/liter of cobalt, and about 4 grams/liter of ferrous iron was heated to about 80° C., and a gaseous mixture of air containing about 1.0% sulfur dioxide by volume was finely dispersed throughout the solution by means of a sintered glass diffuser having a pore size of about 75 microns at a rate of about 30 liters per hour. The result of oxidation employing 1.0% sulfur dioxide is illustrated in the following table:

| Treatment with Air+1.0% SO₂ Time of Treatment in Hours | Treated with Gaseous Mixture of Air+1.0% SO₂ | |
|---|---|---|
| | Fe++, gms./l. | pH |
| 0 | 4.0 | 3.18 |
| 0.5 | 2.6 | 1.68 |
| 1.0 | 1.4 | 1.58 |
| 1.5 | 0.15 | 1.46 |
| 2.0 | Nil | 1.32 |

It is observed from the foregoing table that a mixture of air and 1.0% sulfur dioxide produces complete oxidation of ferrous iron to ferric iron in two hours, and that the pH is reduced from 3.18 to 1.32 after two hours of treatment. However, a comparison test conducted in an identical manner but using $SO_2$-free air as the oxidizing agent yielded an iron content of 3.1 grams per liter and a pH of 2.13 at the end of two hours.

EXAMPLE IV

In a further example, five hundred cubic centimeters of solution (120 grams per liter nickel sulfate, 4.0 grams per liter of ferrous iron as sulfate) were kept at 80° C. in a container. Twenty liters per hour of air containing 1% sulfur dioxide by volume were passed through a diffuser disc having a pore size of about 65 microns into the solution and the following results were obtained:

| Time (hours) | Ferrous Iron Content, g. p. l. | pH |
|---|---|---|
| 0.0 | 4.0 | 3.18 |
| .5 | 2.5 | 1.82 |
| 1.0 | 1.3 | 1.60 |
| 1.5 | 0.13 | 1.51 |
| 2.0 | Nil | 1.35 |

In contradistinction to the foregoing example and to demonstrate the critical nature of the physical dispersion of the bubbles of oxidizing gas required in accordance with the present invention, the following experiment was conducted according to prior art teachings:

A tower 4.5 centimeters in diameter and 25 centimeters high was constructed having gas and liquor inlets and outlets. The tower was packed with crushed glass of particle size such that it passed a one-quarter inch mesh screen but was retained on a one-tenth inch mesh screen. The tower was externally gas-heated and was maintained at 80° C. A liquor containing 100 grams per liter of nickel as nickel sulfate, 10 grams per liter of cobalt, and 4.0 grams per liter of ferrous iron was circulated such that it passed downwardly through the packed tower at a rate of 250 cubic centimeters per hour. A gas mixture of air containing 1% sulfur dioxide by volume was countercurrently passed through the apparatus at a rate of 20 liters per hour. The liquor was repeatedly passed through the apparatus until the ferrous iron content and pH of the solution issuing from the bottom of the tower remained constant. This state was reached during the fourth passage of the liquor through the tower. The ferrous iron content and the pH of the solution were checked at intervals as follows:

|  | Period, hours | Ferrous iron, gms./l. | pH |
|---|---|---|---|
| First pass | 0 | 4.0 | 3.65 |
|  | ½ | 3.3 | 1.69 |
|  | 1 | 3.7 | 1.65 |
|  | 1½ | 3.3 | 1.56 |
|  | 2 | 2.5 | 1.31 |
| Second pass | ½ | 2.1 | 1.10 |
|  | 1 | 2.2 | 1.14 |
|  | 1½ |  | 1.22 |
|  | 2 | 2.4 | 1.17 |
| Third pass | ½ | 2.5 | 0.62 |
|  | 1 | 2.5 | 0.58 |
|  | 1½ | 2.7 | 0.54 |
| Fourth pass | ½ | 2.5 | 0.49 |
|  | 1 | 2.7 | 0.50 |

It will be noted that the iron concentration was reduced by only about 35% in this experiment with an equilibrium being reached at an iron concentration of about 2.6 grams per liter of ferrous iron.

The present invention is particularly applicable to treating iron-contaminated sulfate solutions containing metal selected from the group consisting of nickel and cobalt, i. e., to treating iron-contaminated sulfate solutions containing cobalt, nickel, or mixtures of cobalt and nickel. These sulfate solutions principally occur in commercial processes, such as in the electrolytic refining of nickel and/or cobalt employing electrolytic solutions, or in the electrolytic refining of copper producing electrolytic solutions. Other solutions treatable by the present process occur in commercial operations such as those involving the acidic dissolution of mattes containing nickel and/or cobalt.

It is to be observed that the present invention provides a process for removing iron from nickel- and/or cobalt-containing solutions without substantial loss of nickel and/or cobalt in practicing the process.

Furthermore, the invention provides a process for producing a removable precipitate of iron from nickel and/or cobalt solutions wherein the precipitate of iron is substantially devoid of nickel and/or cobalt and wherein a nickel and/or cobalt solution is produced which is substantially devoid of iron.

The present application is a continuation-in-part of our copending patent application Serial No. 183,458, filed September 6, 1950, and now abandoned.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

We claim:

1. In the process of purifying aqueous sulfate solutions containing at least one of the group consisting of nickel sulfate and cobalt sulfate and contaminated with ferrous sulfate, the improvement which comprises establishing an aqueous sulfate solution having a pH of about 3 to 5 and containing at least one of the group consisting of nickel sulfate and cobalt sulfate and contaminated with ferrous iron as ferrous sulfate; contacting said solution with a stream of finely-dispersed bubbles of an oxidizing gas comprising a mixture of air containing about 0.25% to 3% of sulfur dioxide, said gas being reduced to said stream of finely-dispersed bubbles by passing said gas into said solution through a porous membrane having a maximum pore size of about 100 microns; maintaining said stream of finely-dispersed gas bubbles in contact with said solution until substantially all the ferrous iron in said solution is oxidized to the ferric state and the pH of said solution is lowered while maintaining the solution temperature within a range of about 80° C. to about 90° C.; thereafter adding a basic agent from the group consisting of the hydroxides and carbonates of nickel and cobalt to said solution to precipitate substantially all of said ferric iron; and separating said iron precipitate from said solution whereby the aforesaid aqueous solution is purified.

2. In the process for separating iron from an aqueous sulfate solution containing at least one from the group consisting of nickel sulfate and cobalt sulfate and containing ferrous iron in the form of ferrous sulfate as a contaminant in an amount up to about 8 grams per liter of ferrous iron, the improvement which comprises adjusting the temperature of the sulfate solution to at least about 80° C. and the solution pH to the range of about 3 to 5; contacting said solution with a stream of finely-dispersed bubbles of an oxidizing gas comprising a mixture of air containing about 0.25% to 5% sulfur dioxide, said gas being reduced to said stream of finely-dispersed bubbles by passing said gas into said solution through a porous membrane having a maximum pore size of about 100 microns; maintaining said stream of finely-dispersed gas bubbles in contact with said solution and agitating said solution until substantially all the ferrous iron in said solution is oxidized to the ferric state and the pH of said solution is lowered; thereafter precipitating the ferric iron so produced in a form substantially devoid of nickel and cobalt by adding a basic agent from the group consisting of the hydroxides and carbonates of nickel and cobalt to said solution to raise the pH thereof to a value of about 3 to 4; and separating said iron precipitate from the solution to provide a purified solution containing metal from the group consisting of nickel and cobalt but devoid of iron.

3. In the process of purifying aqueous sulfate solutions containing at least one of the group consisting of nickel sulfate and cobalt sulfate and contaminated with ferrous iron as ferrous sulfate, the improvement which comprises establishing an aqueous sulfate solution having a pH between about 3 and about 5 and containing at least one metal from the group consisting of nickel and cobalt and contaminated with ferrous iron; contacting said solution with a stream of finely-dispersed bubbles of an oxidizing gas comprising a mixture of air containing about 0.25% to 3% sulfur dioxide, said gas being reduced to said stream of finely-dispersed bubbles by passing said gas into said solution through a porous membrane having a maximum pore size of about 100 microns; maintaining said stream of finely-dispersed gas bubbles in contact with said solution to effect an oxidation of substantially all the ferrous iron in said solution to ferric iron while maintaining the solution temperature within a range of about 80° C. to about 90° C.; thereafter adding a basic agent selected from the group consisting of the hydroxides and carbonates of nickel and cobalt to said solution to precipitate substantially all said ferric iron; and separating said iron precipitate from said solution whereby the aforesaid aqueous solution is purified.

4. In the process for separating iron from a sulfate of the group consisting of nickel sulfate and cobalt sulfate in aqueous solution with iron as ferrous sulfate, the improvement which comprises adjusting the solution temperature to at least about 80° C. and the solution pH such that it does not exceed about pH 5; contacting said solution with a stream of finely-dispersed bubbles of an oxidizing gas comprising a mixture of air containing about 0.25% to 5% sulfur dioxide, said gas being reduced to said stream of finely-dispersed bubbles by passing said gas into said solution through a porous membrane having a maximum pore size of about 100 microns; maintaining said stream of finely-dispersed gas bubbles in contact with said solution until substantially all the ferrous iron in said solution is oxidized to the ferric state; thereafter adding a basic agent from the group consisting of the hydroxides and carbonates of nickel and cobalt, sodium carbonate and lime to said solution to precipitate substantially all of said ferric iron; and separating said ferric iron precipitate from said solution.

References Cited in the file of this patent
UNITED STATES PATENTS

| | | |
|---|---|---|
| 967,072 | Shuler | Aug. 9, 1910 |
| 2,306,425 | Bevan | Dec. 29, 1942 |
| 2,356,183 | Shepard | Aug. 22, 1944 |